(12) United States Patent
Fukazawa

(10) Patent No.: US 8,676,057 B2
(45) Date of Patent: Mar. 18, 2014

(54) OPTICAL TRANSMISSION DEVICE, OPERATIONAL WAVELENGTH NUMBER RESTRICTING METHOD, AND PROGRAM

(75) Inventor: Toshiyuki Fukazawa, Minato-ku (JP)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 13/256,851

(22) PCT Filed: Mar. 17, 2010

(86) PCT No.: PCT/JP2010/054553
§ 371 (c)(1),
(2), (4) Date: Sep. 15, 2011

(87) PCT Pub. No.: WO2010/107061
PCT Pub. Date: Sep. 23, 2010

(65) Prior Publication Data
US 2012/0008956 A1    Jan. 12, 2012

(30) Foreign Application Priority Data
Mar. 18, 2009   (JP) .................................. 2009-066428

(51) Int. Cl.
H04J 14/02     (2006.01)
(52) U.S. Cl.
USPC .......................................................... 398/83
(58) Field of Classification Search
USPC ..................................... 398/43–103, 182, 83
See application file for complete search history.

(56) References Cited

U.S. PATENT DOCUMENTS 6,466,341 B1 * 10/2002 Lumish et al. ................. 398/82
6,535,313 B1 *  3/2003 Fatehi et al. .................. 398/101
6,574,018 B1 *  6/2003 Handelman .................... 398/49
6,583,900 B2 *  6/2003 Onaka et al. .................. 398/59
6,650,809 B2 * 11/2003 He et al. ....................... 385/24
6,947,630 B2 *  9/2005 Kai et al. ...................... 385/24
7,184,666 B1 *  2/2007 Li et al. ........................ 398/83

(Continued)

FOREIGN PATENT DOCUMENTS

JP    2002-199109 A    7/2002
JP    2004-208056 A    7/2004

(Continued)

OTHER PUBLICATIONS

Cao et al, Waveband Switching in Optical Networks, Apr. 2003, IEEE Communications Magazine, Topics in Lightwave, pp. 103-112.*

Primary Examiner — Ken Vanderpuye
Assistant Examiner — Dibson Sanchez
(74) Attorney, Agent, or Firm — Sughrue Mion, PLLC

(57) ABSTRACT

An optical transmission device that is connected to transmission paths of a network, that performs optical communication according to a wavelength division multiplex format and that transmits optical signals over the transmission paths according to path types that have been set to wavelengths of the optical signals, including an upper limit value storage section that stores an upper limit value of the number of operational wavelengths that is the number of wavelengths to which the path types are set; an acceptance section that accepts a changing request that requests that the number of operational wavelengths be changed; and a license determination section that decides the number of operational wavelengths, wherein if the number of wavelengths that has been changed according to the accepted changing request is equal to or smaller than the stored upper limit value, the license determination section newly sets the changed number of wavelengths for the number of operational wavelengths.

15 Claims, 3 Drawing Sheets

(56) References Cited

U.S. PATENT DOCUMENTS

| | | | |
|---|---|---|---|
| 7,653,311 B2 * | 1/2010 | Kikuchi et al. | 398/83 |
| 7,787,768 B2 * | 8/2010 | Pichler et al. | 398/50 |
| 8,494,316 B2 * | 7/2013 | Zhang et al. | 385/24 |
| 2001/0024305 A1 * | 9/2001 | Nishimoto | 359/128 |
| 2003/0002104 A1 * | 1/2003 | Caroli et al. | 359/127 |
| 2004/0190904 A1 * | 9/2004 | Noguchi et al. | 398/85 |
| 2006/0023996 A1 | 2/2006 | Nakagawa et al. | |
| 2009/0297154 A1 * | 12/2009 | Izumi | 398/81 |

FOREIGN PATENT DOCUMENTS

| | | |
|---|---|---|
| JP | 2006-067546 A | 3/2006 |
| JP | 2007-274249 A | 10/2007 |
| JP | 2008-259130 A | 10/2008 |
| JP | 2009-010679 A | 1/2009 |

\* cited by examiner

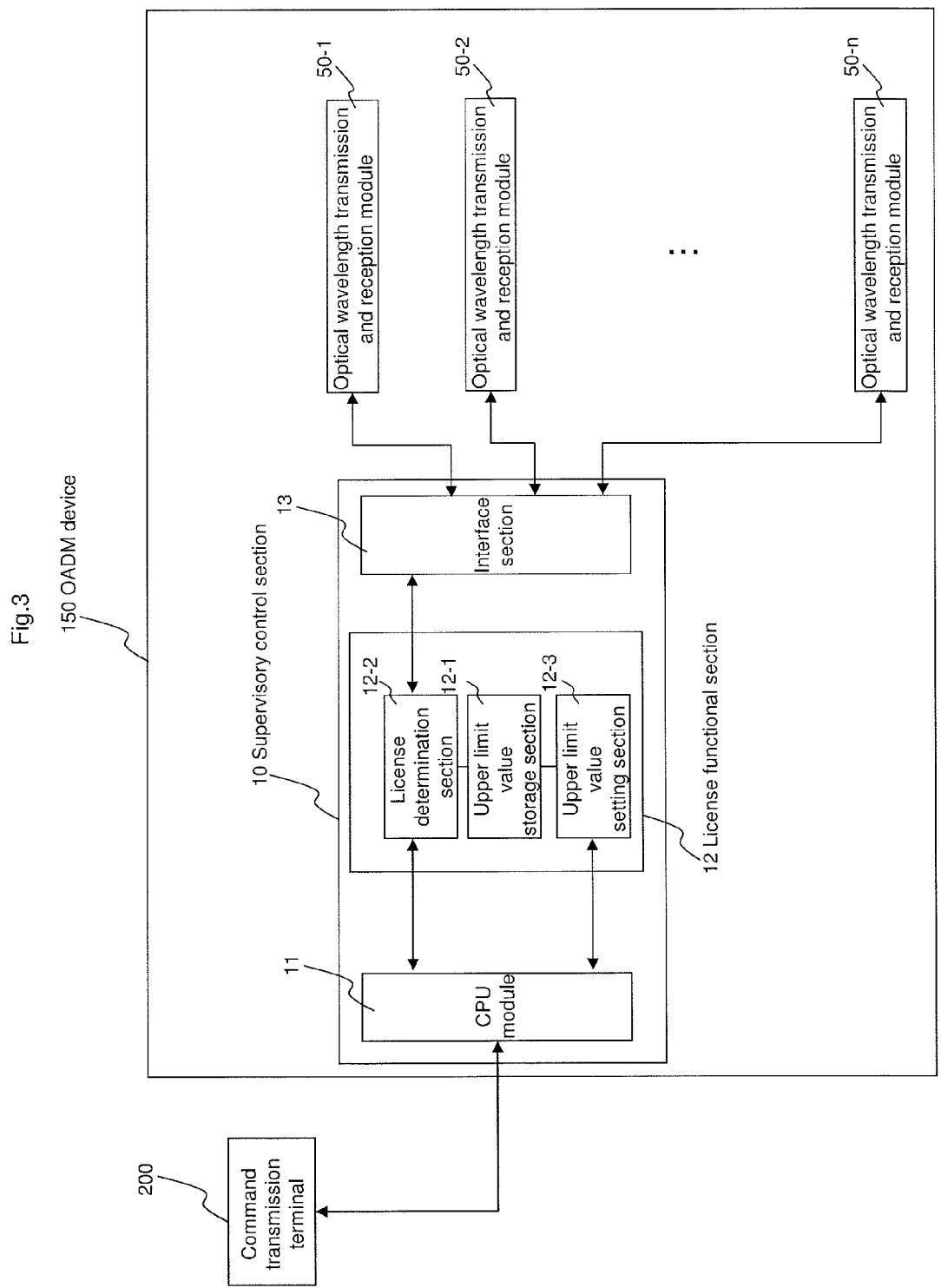

OPTICAL TRANSMISSION DEVICE, OPERATIONAL WAVELENGTH NUMBER RESTRICTING METHOD, AND PROGRAM

CROSS REFERENCE TO RELATED APPLICATION

This application is a National Stage of International Application No. PCT/JP2010/054553 filed Mar. 17, 2010, claiming priority based on Japanese Patent Application No. 2009-066428, filed Mar. 18, 2009, the contents of all of which are incorporated herein by reference in their entirety.

TECHNICAL FIELD

The present invention relates to an optical transmission device, an operational wavelength number restricting method, and a program that are used for an optical communication system that communicates according to a wavelength division multiplex format.

BACKGROUND ART

As communication capacity has increased in recent years, OADM (Optical Add Drop Multiplexer) devices that perform optical transmission according to the wavelength division multiplex (WDM) format have been introduced in the backbone and metro areas.

This OADM device is used, for example, for a bidirectional ring transmission path and has a function that branches/inserts an optical signal over the transmission path. Thus, the OADM device sets through (hereinafter abbreviated as THR) or ADD/DROP for each operational optical wavelength.

A related art reference of the present invention discloses a technique that restricts not only the number of wavelengths that can be used at a time on a particular incoming line but also the wavelength group that can be used at a time on a particular outgoing line at all edge nodes contained in a wavelength multiplex network that uses a network management device and a relay device so as to prevent optical fibers from being burnt and damaged (for example, refer to Patent Literature 1).

Another related art reference discloses a technique that controls connections to inter-carrier lines if an interconnecting gateway switch that performs switching and connection between different communication carriers detects passing calls under restriction such that the number of lines or ratio used for passing calls under restriction of inter-carrier lines becomes equal to or smaller than a predetermined number of lines or ratio (for example, refer to Patent Literature 2).

RELATED ART LITERATURE

Patent Literature

Patent Literature 1: JP2004-208056A, Publication
Patent Literature 2: JP2002-199109A, Publication

SUMMARY OF THE INVENTION

Problem to be Solved by the Invention

However, since an OADM device does not have an upper limit value of the number of operational wavelengths to which path types are set, any wavelengths can be set for the OADM device. Thus, as the entire operation of the wavelength multiplex network in which OADM devices are arranged, it is likely that the upper limit value of the number of operational wavelengths as a hardware performance of the OADM device that is arranged may exceed the upper limit value of the preferable number of operational wavelengths.

If the upper limit value of the number of operational wavelengths of the OADM device is superior to the upper limit value of the preferable number of operational wavelengths in the entire wavelength multiplex network on specifications, the number of operational wavelengths that are multiplexed exceeds the designing condition as the wavelength multiplex network. In this case, it is likely that the transmission characteristics may deteriorate.

In addition, the technique of the related art reference disclosed as Patent Literature 1 restricts the number of wavelengths in the entire wavelength multiplex network so as to prevent optical fibers from being burnt and damaged. Thus, the technique of this related art reference does not consider optimization for the upper limit value of the number of operational wavelengths according to individual network environments of individual OADM devices.

In addition, the technique of the related art reference disclosed as Patent Literature 1 needs extra dedicated devices such as a network management device and a relaying device in addition to each OADM device and thereby it also imposes their cost.

In contrast, the technique of the related art reference disclosed as Patent Literature 2 uses an interconnecting gateway switch so as to restrict the number of lines assigned to passing calls under restriction of inter-carrier lines. Thus, the technique of this related art reference does not consider allowing signal operations, such as allocations of operational wavelengths and lines based on the wavelengths, to be freely changed on optical communication and optimization for the upper limit value of the number of operational wavelengths.

An object of the present invention is to provide an optical transmission device, an operational wavelength number restricting method, and a program that allow the number of operational wavelengths to be appropriately restricted according to the state of each network without necessity of imposing extra cost.

Means that Solve the Problem

To accomplish the above-described object, an optical transmission device according to the present invention is an optical transmission device that is connected to transmission paths of a network, that performs optical communication according to a wavelength division multiplex format and that transmits optical signals over the transmission paths according to path types that have been set to wavelengths of the optical signals, comprising:

an upper limit value storage section that stores an upper limit value of the number of operational wavelengths that is the number of wavelengths to which said path types are set;

an acceptance section that accepts a changing request that requests that said number of operational wavelengths be changed; and a license determination section that decides said number of operational wavelengths, wherein if the number of wavelengths that has been changed according to said accepted changing request is equal to or smaller than said stored upper limit value, said license determination section newly sets the changed number of wavelengths for the number of operational wavelengths.

In addition, to accomplish the above-described object, an operational wavelength number restricting method according to the present invention is an operational wavelength number restricting method for an optical transmission device having an optical wavelength path selecting section that is connected to transmission paths of a network, that performs optical communication according to a wavelength division multiplex format, that transmits optical signals over the transmission paths according to path types that have been set to wavelengths of the optical signals, and that manages path types of wavelengths to which said path types have been set and an optical power level supervisory section that manages power levels of optical signals having wavelengths to which said path types have been set, comprising:

a process that accepts a changing request that requests that said number of operational wavelengths be changed; and a determination process that newly sets the changed number of wavelengths for the number of operational wavelengths if the number of wavelengths that has been changed according to said accepted changing request is equal to or smaller than a predetermined upper limit value.

In addition, to accomplish the above-described object, a program according to the present invention is a program that causes an optical transmission device having an optical wavelength path selecting section that is connected to transmission paths of a network, that performs optical communication according to a wavelength division multiplex format, that transmits optical signals over the transmission paths according to path types that have been set to wavelengths of the optical signals, and that manages path types of wavelengths to which said path types have been set and an optical power level supervisory section that manages power levels of optical signals having wavelengths to which said path types have been set to accomplish the functions, comprising:

a function that accepts a changing request that requests that said number of operational wavelengths be changed; and a determination function that newly sets the changed number of wavelengths for the number of operational wavelengths if the number of wavelengths that has been changed according to said accepted changing request is equal to or smaller than a predetermined upper limit value.

Effect of the Invention

Since the present invention is structured as described above, the number of operational wavelengths can be appropriately restricted according to the state of each network without the necessity of imposing an extra cost.

BRIEF DESCRIPTION OF DRAWINGS

FIG. 3 is a block diagram showing the structure of a wavelength number setting system including an OADM device as an optical transmission device according to a second embodiment of the present invention.

BEST MODES THAT CARRY OUT THE INVENTION

With reference to drawings, an OADM device to which an optical transmission device, an operational wavelength number restricting method, and a program according to an embodiment of the present invention are applied will be described.

First, this embodiment will be outlined.

A main feature of this embodiment is that the maximum number of operational wavelengths that is the number of wavelengths of optical signals used in an OADM device is restricted by using a license function, any one of through (THR) and ADD/DROP being set to each of the wavelengths.

The THR is a setting for which an optical signal passes through the OADM device as is. The ADD/DROP is a setting for which an optical signal is terminated by the OADM device.

The license function allows the user to input a license key (license information) that has been issued such that the restricted function of the OADM device can be used.

This embodiment is in that if the number of operational wavelengths that is set according to a command exceeds the upper limit value of the number of operational wavelengths restricted by the license function, an error response is issued and the setting for the number of operational wavelengths is restricted.

If the number of operational wavelengths is restricted as described above, the upper limit value of the number of operational wavelengths can be set for each OADM device and thereby the flexibility for setting each OADM device improves. In addition, a function that changes the upper limit value of the number of operational wavelengths may be provided as an extensional function.

Thus, according to this embodiment, when the user transmits a command that requests that the number of operational wavelengths be changed unless he or she has not input the license key, if the number of operational wavelengths becomes equal to or greater than the upper limit value of the number of operational wavelengths that has been set by the license function, an error occurs and the changing for the number of operational wavelengths is restricted.

The command is restricted in the following two sections that manage the setting for path types of wavelengths.

(1) If the number of wavelengths to which path types are set in an optical power level supervisory section becomes greater than the upper limit value of the number of operational wavelengths that are set by the license function, an error message is returned and changing the number of operational wavelengths is restricted.

(2) If the number of wavelengths to which path types have been set in a path selection device provided in an optical wavelength path selecting section becomes greater than the upper limit value of the number of operational wavelengths that is set by the license function, an error message is returned and changing the number of operational wavelengths is restricted.

Figure 1:
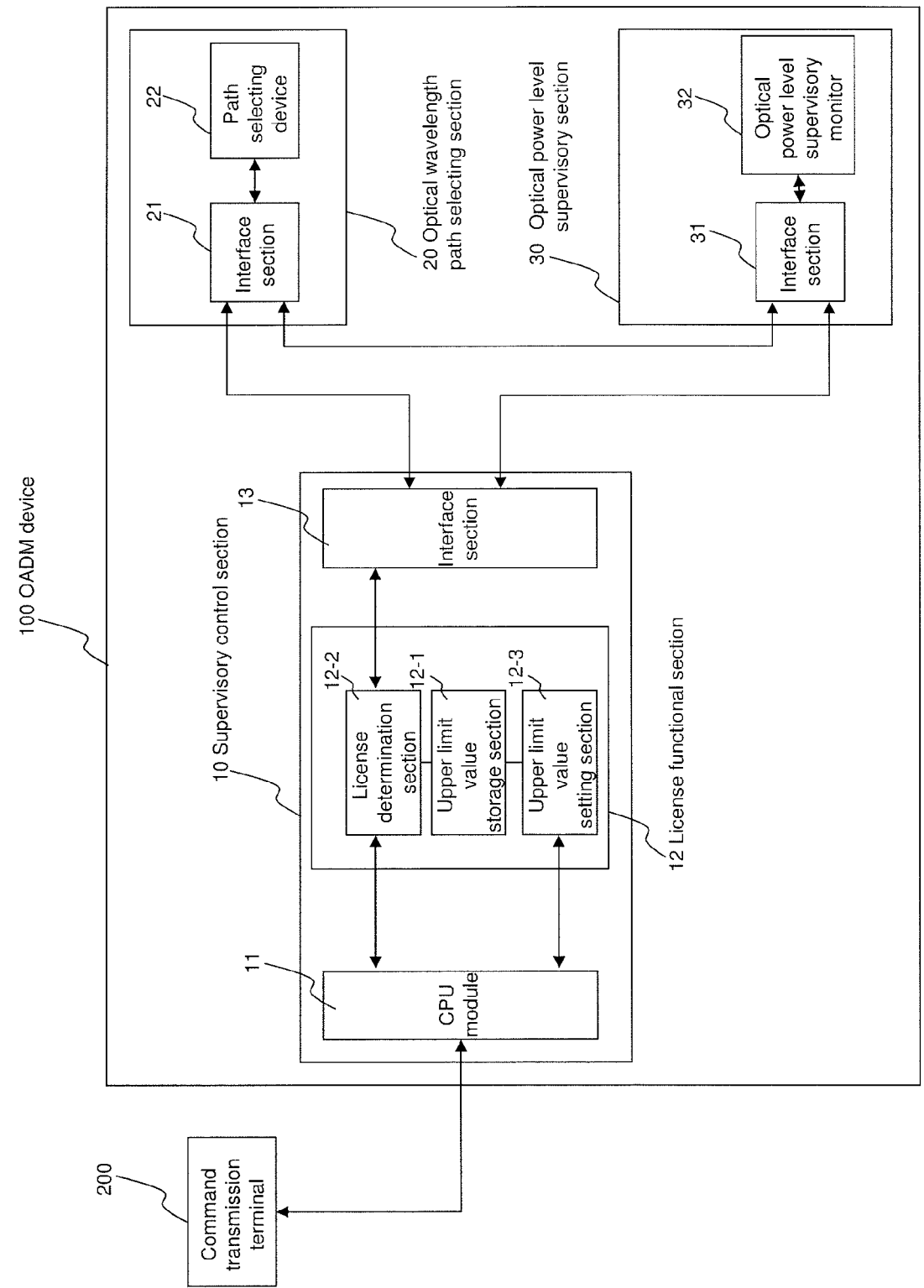
FIG. 1 is a block diagram showing the structure of a wavelength number setting system including an OADM device as an optical transmission device according to a first embodiment of the present invention.

FIG. 1 is a block diagram showing the structure of a wavelength number setting system including an OADM device as an optical transmission device according to a first embodiment of the present invention.

As shown in FIG. 1, the wavelength number setting system according to this embodiment is provided with OADM device 100 and command transmission terminal 200.

Command transmission terminal 200 is connected to OADM device 100 directly or through a network or the like. Command transmission terminal 200 accepts a request that causes a wavelength, to which a path type is set, to be added or a request that causes a wavelength, to which a path type has been set, to be deleted from the user. Then, command transmission terminal 200 transmits an operational wavelength number changing command that is a changing request that causes the wavelength, to which a path type is set, to be added or a changing request that causes the wavelength, to which a path type has been set, to be deleted to OADM device 100.

OADM device 100 is provided with supervisory control section 10, optical wavelength path selecting section 20, and optical power level supervisory section 30.

Supervisory control section 10 is a section that manages information of entire OADM device 100 and is provided with CPU module 11 that is an acceptance section, license functional section 12, and interface section 13.

CPU module 11 receives the operational wavelength number changing command from command transmission terminal 200 and computes the total value of the number of wavelengths contained in the received operational wavelength number changing command and the number of operational wavelengths. Hereinafter, the computed total value is referred to as the total number of operational wavelengths.

License functional section 12 is provided with upper limit value storage section 12-1, license determination section 12-2, and upper limit value setting section 12-3.

Upper limit value storage section 12-1 prestores the upper limit value of the number of operational wavelengths that has been set by the license function.

License determination section 12-2 compares the total number of operational wavelengths computed by CPU module 11 with the upper limit value of the number of operational wavelengths stored in upper limit value storage section 12-1. If the compared result denotes that the total number of operational wavelengths is greater than the upper limit value of the number of operational wavelengths, license determination section 12-2 transmits an error message, that denotes that the execution has failed, to command transmission terminal 200 through CPU module 11. In contrast, if the compared result denotes that the total number of operational wavelengths is equal to or smaller than the upper limit value of the number of operational wavelengths, license determination section 12-2 outputs setting information containing the total number of operational wavelengths to optical wavelength path selecting section 20 and to the power level supervisory section 30 through interface section 13. Upper limit value setting section 12-3 will be described later.

Interface section 13 intermediates transmission and reception of information among supervisory control section 10, optical wavelength path selecting section 20, and optical power level supervisory section 30.

Optical wavelength path selecting section 20 manages path types that have been set to wavelengths and is provided with interface section 21 and path selecting device 22.

Interface section 21 intermediates transmission and reception of information among optical wavelength path selecting section 20, supervisory control section 10, and optical power level supervisory section 30.

Path selecting device 22 accepts setting information that is output from supervisory control section 10 through interface section 21. Then, path selecting device 22 sets a path type based on the accepted setting information.

Optical power level supervisory section 30 manages the power levels of optical signals having wavelengths to which path types have been set and is provided with interface section 31 and optical power level supervisory monitor 32.

Interface section 31 intermediates transmission and reception of information among optical power level supervisory section 30, supervisory control section 10, and optical wavelength path selecting section 20.

Optical power level supervisory monitor 32 accepts setting information that is output from supervisory control section 10 through interface section 31. Then, optical power level supervisory monitor 32 monitors the transmission and reception power levels of optical signals having wavelengths to which path types have been set based on the accepted setting information.

In the following, the operation of OADM device 100 in the wavelength number setting system having the above-described structure will be described.

Figure 2:
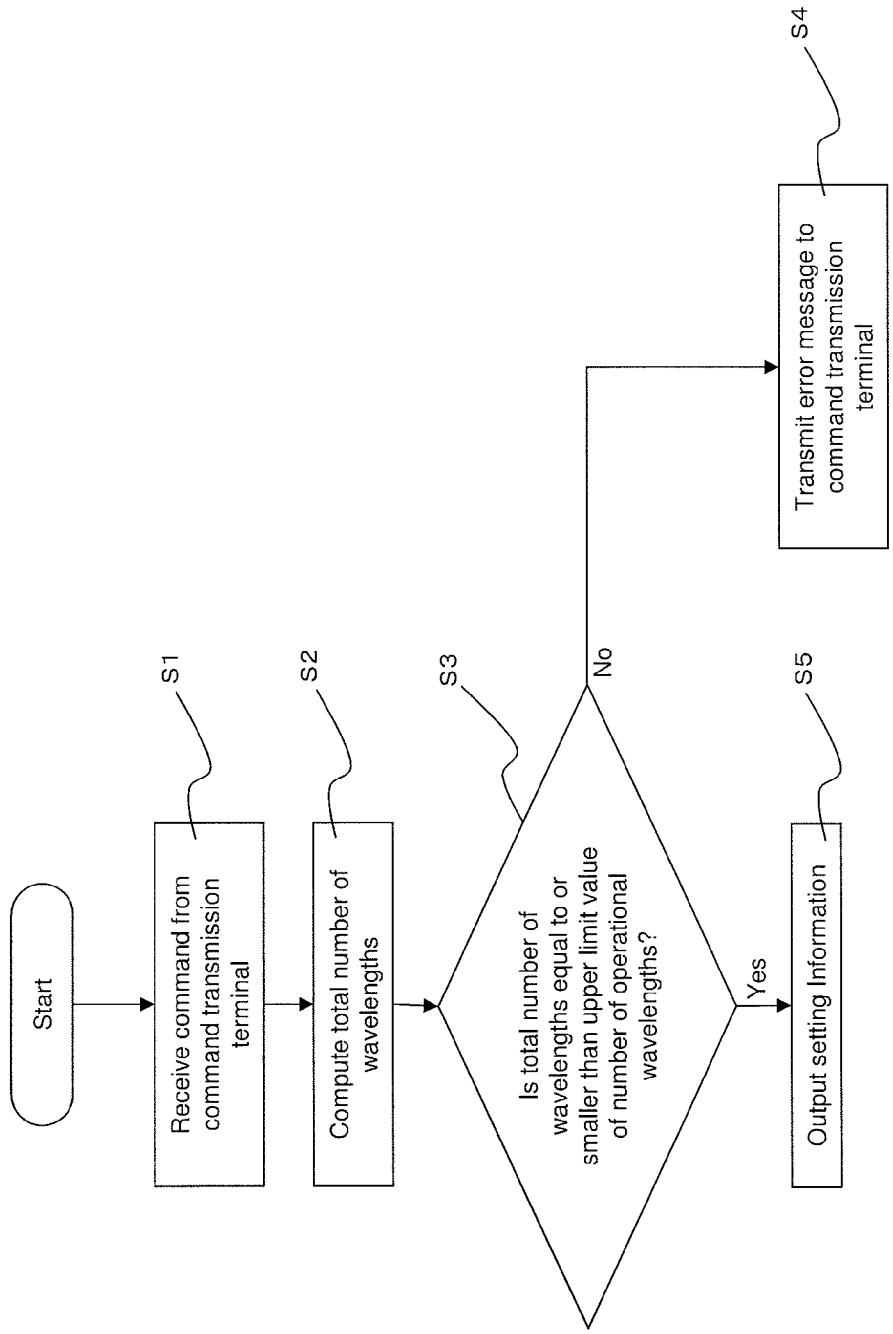
FIG. 2 is a flow chart describing the operation of the OADM device shown in FIG. 1.

FIG. 2 is a flow chart describing the operation of OADM device 100 shown in FIG. 1.

First, the user inputs a request that causes a wavelength, to which a path type is set, to be added or a request that causes a wavelength, to which a path type has been set, to be deleted to command transmission terminal 200.

When command transmission terminal 200 accepts the input from the user, command transmission terminal 200 transmits the operational wavelength number changing command according to the input request to OADM device 100.

Then, CPU module 11 of supervisory control section 10 provided in OADM device 100 receives the operational wavelength number changing command from command transmission terminal 200 at step S1.

Then, CPU module 11 computes the total number of operational wavelengths that is the total value of the total number of wavelengths contained in the received operational wavelength number changing command and the number of operational wavelengths at step S2.

Then, license determination section 12-2 of license functional section 12 compares the total number of operational wavelengths computed by CPU module 11 with the upper limit value of the number of operational wavelengths stored in upper limit value storage section 12-1 at step S3.

If the compared result at step S3 denotes that the total number of operational wavelengths is greater than the upper limit value of the number of operational wavelengths, license determination section 12-2 transmits an error message that denotes that the execution has failed to command transmission terminal 200 through CPU module 11 at step S4. In other words, the number of operational wavelengths is not changed.

In contrast, if the compared result at step S3 denotes that the total number of operational wavelengths is equal to or smaller than the upper limit value of the number of operational wavelengths, license determination section 12-2 outputs setting information to optical wavelength path selecting section 20 and optical power level supervisory section 30 through interface section 13 at step S5.

Then, path selecting device 22 of optical wavelength path selecting section 20 accepts the setting information that is output from supervisory control section 10 through interface section 21.

Likewise, optical power level supervisory monitor 32 of optical power level supervisory section 30 accepts the setting information that is output from supervisory control section 10 through interface section 31.

Thus, optical wavelength path selecting section 20 sets path types based on the accepted setting information. On the other hand, optical power level supervisory section 30 monitors the transmission and reception power levels of optional signals having wavelengths contained in the accepted setting information. In other words, the number of operational wavelengths is changed.

Specific Example 1

Next, with reference to FIG. 1 and FIG. 2, the above-described operation will be described using specific examples.

In Specific Example 1, it is assumed that the number of operational wavelengths that have been set for OADM device is 12 and the upper limit value of the number of operational wavelengths stored in upper limit value storage section 12-1 is 20 at a particular time during the system operation.

First, the user inputs a request that causes 10 wavelengths, to which path types are set, to be added to command transmission terminal 200.

When command transmission terminal 200 accepts the input from the user, command transmission terminal 200 transmits the operational wavelength number changing command that includes 10 wavelengths and that causes path types to be added and set to the 10 wavelengths to OADM device 100.

Then, CPU module 11 of supervisory control section 10 provided in OADM device 100 receives the operational wavelength number changing command from command transmission terminal 200 at step S1.

Then, CPU module 11 computes the total number of operational wavelengths that is the total value of the number of wavelengths contained in the received operational wavelength number changing command and the number of operational wavelengths at step S2. In this example, as described above, the number of wavelengths contained in the received operational wavelength number changing command is 10 and the number of operational wavelengths is 12. Thus, the total number of operational wavelengths computed by CPU module 11 is 22.

Then, license determination section 12-2 of license functional section 12 compares the total number of operational wavelengths computed by CPU module 11 with the upper limit value of the number of operational wavelengths stored in upper limit value storage section 12-1 at step S3. In this example, the total number of operational wavelengths is 22 and the upper limit value of the number of operational wavelengths is 20. Thus, the total number of operational wavelengths is greater than the upper limit value of the number of operational wavelengths. As a result, license determination section 12-2 transmits an error message that denotes the execution has failed to command transmission terminal 200 through CPU module 11 at step S4. In other words, path types are not set to 10 wavelengths and thereby the number of operational wavelengths does not change from 12.

Specific Example 2

Then, in Specific Example 2, it is assumed that the number of operational wavelengths that have been set for OADM device is 5 and the upper limit value of the number of operational wavelengths stored in upper limit value storage section 12-1 is 20 at a particular time during the system operation.

First, the user inputs a request that causes 10 wavelengths, to which path types are set to be added, to command transmission terminal 200.

When command transmission terminal 200 accepts the input from the user, command transmission terminal 200 transmits the operational wavelength number changing command that includes 10 wavelengths and that causes path types to be added and set to the 10 wavelengths to OADM device 100.

Then, CPU module 11 of supervisory control section 10 provided in OADM device 100 receives the operational wavelength number changing command from command transmission terminal 200 at step S1.

Then, CPU module 11 computes the total number of operational wavelengths that is the total value of the number of wavelengths contained in the received operational wavelength number changing command and the number of operational wavelengths at step S2. In this example, as described above, the number of wavelengths contained in the received operational wavelength number changing command is 10 and the number of operational wavelengths is 5. Thus, the total number of operational wavelengths computed by CPU module 11 is 15.

Then, license determination section 12-2 of license functional section 12 compares the total number of operational wavelengths computed by CPU module 11 with the upper limit value of the number of operational wavelengths stored in upper limit value storage section 12-1 at step S3. In this example, the total number of operational wavelengths is 15 and the upper limit value of the number of operational wavelengths is 20. Thus, the total number of operational wavelengths is equal to or smaller than the upper limit value of the number of operational wavelengths. Thus, license determination section 12-2 transmits setting information containing the total number of operational wavelengths to operational wavelength path selecting section 20 and optical power level supervisory section 30 through interface section 13. In other words, path types are newly set to 5 wavelengths and the number of operational wavelengths becomes 15.

Thus, according to this embodiment, by restricting the number of operational wavelengths, the number of operational wavelengths for each device can be changed and thereby the flexibility of settings for devices improves.

OADM devices that have appeared in recent years have a function that remotely sets a path type so as to decide the path of an optical signal having a predetermined wavelength.

According to this embodiment, using this ordinary remote setting function, the number of operational wavelengths can be remotely restricted in a simple structure without necessity of implementing an extra program serving to input a setting.

In addition, according to this embodiment, using such an ordinary license function, the number of operational wavelengths is restricted. Thus, the number of operational wavelengths can be restricted in a simple structure without necessity of implementing an extra program that serves to restrict the number of operational wavelengths.

Moreover, according to this embodiment, since license functional section 12 performs the above-described process based on the setting for a path type that is input, each of the above-described effects can be obtained without it being necessary to provide extra devices such as a central control device and a relaying device. Thus, based on the setting that the user, such as a network administrator, performs on command transmission terminal 200, the number of operational wavelengths can be adequately restricted depending on the state of the network to which the OADM device according to this embodiment is connected.

Thus, the number of operational wavelengths can be adequately restricted depending on the state of each network without necessity of imposing extra costs.

In addition, according to this embodiment, the function that changes the upper limit value of the number of operational wavelengths stored in upper limit value storage section 12-1 can be provided as a functional extension.

In this case, the user inputs a request that causes the upper limit value of the number of operational wavelengths to be changed on command transmission terminal 200. Then, command transmission terminal 200 transmits an upper limit value change command that contains a new upper limit value of the number of operational wavelengths and that is an upper limit value changing request that causes the upper limit value of the number of operational wavelengths to be changed to OADM device 100.

When CPU module 11 of supervisory control section 10 provided in OADM device 100 receives the upper limit value changing command from command transmission terminal 200, CPU module 11 outputs the new upper limit value contained in the received upper limit value changing command to upper limit value setting section 12-3 of license functional section 12.

If the accepted new upper limit value is equal to or smaller than the number of wavelengths predetermined based on the hardware performance of OADM device 100, upper limit value setting section 12-3 that has accepted the new upper limit value that is output from CPU module 11 sets the accepted new upper limit value for the upper limit value of the number of operational wavelengths decided as the license function. Then, upper limit value setting section 12-3 stores the accepted new upper limit value as the upper limit value of the number of operational wavelengths to upper limit value storage section 12-1. In contrast, if the accepted new upper limit value is greater than the predetermined number of wavelengths predetermined based on the hardware performance of OADM device 100, upper limit value setting section 12-3 transmits the error message that denotes that the execution has failed to command transmission terminal 200 through CPU module 11. In other words, the upper limit value of the number of operational wavelengths stored in upper limit value storage section 12-1 is not changed.

Thus, according to this embodiment, for example, as a functional extension or the like, the upper limit value of the number of operational wavelengths can be increased or decreased.

Second Embodiment

FIG. 3 is a block diagram showing the structure of a wavelength number setting system including an OADM device as an optical transmission device according to a second embodiment of the present invention.

According to the above-described first embodiment, if the total number of operational wavelengths is equal to or smaller than the upper limit value of the number of operational wavelengths, setting information is output to optical wavelength path selecting section 20 and optical power level supervisory section 30.

According to the second embodiment, if the total number of operational wavelengths is equal to or smaller than the upper limit value of the number of operational wavelengths, license determination section 12-2 sets optical wavelength transmission and reception modules 50-1 to 50-n that transmit and receive optical signals corresponding to the total number of operational wavelengths.

Here, description of similar sections to those according to the above-described first embodiment will be omitted.

Optical wavelength transmission and reception modules 50-1 to 50-n receive individual wavelengths of an WDM signal over a network transmission path to which OADM device 150 is connected.

Optical wavelength transmission and reception modules 50-1 to 50-n need to be set corresponding to the number of wavelengths. Thus, by restricting the number of optical wavelength transmission and reception modules 50-1 to 50-n that are set, the number of operational wavelengths that is the number of wavelengths to which path types are set can be restricted.

Although the operational flow of OADM device 150 according to this embodiment is similar to the operational flow of OADM device 100 described with reference to FIG. 2, an entity that is added by a command transmitted from command transmission terminal 200 to OADM device 150 is different from an entity that is added by a command transmitted from command transmission terminal 200 to OADM device 100. In other words, a command that is transmitted from command transmission terminal 200 to OADM device 150 is a command that requests that the number of optical wavelength transmission and reception modules be added or reduced. Hereinafter, this command is referred to as the module number changing command. As described above, optical wavelength transmission and reception modules 50-1 to 50-n need to be set corresponding to the number of wavelengths. Thus, the module number changing command substantially becomes a changing request that causes the number of operational wavelengths to be changed.

The module number changing command that is transmitted from command transmission terminal 200 is received by CPU module 11 of supervisory control section 10 provided in OADM device 150. Then, CPU module 11 computes the total value of the number of optical wavelength transmission and reception modules that are set and contained in the received module number changing command and the number of optical wavelength transmission and reception modules that has been set before the module number changing command is transmitted. Hereinafter, the computed total value is referred to as the total number of modules.

License determination section 12-2 compares the total number of modules computed by CPU module 11 with the upper limit value of the number of operational wavelengths stored in upper limit value storage section 12-1. If the compared result denotes that the total number of modules is greater than the upper limit value of the number of operational wavelengths, license determination section 12-2 transmits an error message that denotes that the execution has failed to command transmission terminal 200 through CPU module 11. In contrast, if the compared result denotes that the total number of modules is equal to or smaller than the upper limit value of the number of operational wavelengths, the optical wavelength transmission and reception modules are set corresponding to the total number of modules.

According to this embodiment, although the number of optical wavelength transmission and reception modules 50-1 to 50-n that are set is restricted, similar effects to those according to the above-described first embodiment can be obtained.

Although the above-described first and second embodiments are preferred embodiments of the present invention, the present invention is not limited to them; instead, the structure and details of the present invention may be changed in various manners without departing from the spirit of the present invention.

For example, the error message transmitted to command transmission terminal 200 may contain the same contents as an error message corresponding to another command or a dedicated error message that denotes that the setting value is greater than the upper limit value of the number of operational wavelengths.

In addition, it is not important whether each functional section such as supervisory control section 10 according to the above-described first and second embodiments is provided inside or outside a single casing.

For example, even if supervisory control section 10 is provided outside OADM device 100, 150 or the command input function of command transmission terminal 200 is provided inside OADM device 100, 150, the present invention can be accomplished likewise.

In the above-described first and second embodiments, OADM devices are exemplified. However, the present invention can be applied to various types of devices as long as they can restrict the number of operational wavelengths based on the license function.

Instead, if a procedure that accomplishes an OADM device according to each of the above-described first and second embodiments is recorded as a program to a record medium, each of the above-described functions of each of the embodiments can be accomplished by causing a CPU of a computer that composes the device to execute the procedure.

In this case, even if an information group containing the program is supplied from the above-described record medium or from an external record medium through a network, the present invention can be applied likewise.

In other words, a program code itself that is read from the record medium accomplishes a novel function of the present invention and the record medium that records the program code and a signal that is read from the record medium constitutes the present invention.

Examples of this record medium include a flexible disk, a hard disk, an optical disc, a magneto-optical disc, a CD-ROM, a CD-R, a CD-RW, a DVD-ROM, a DVD-RAM, a DVD-RW, a DVD+RW, a magnetic tape, a non-volatile memory card, and a ROM.

The program according to the present invention allows an optical transmission device such as an OADM device controlled according to the program to accomplish each function of each of the above-described embodiments.

Now, with reference to the embodiments, the present invention has been described. However, it should be understood by those skilled in the art that the structure and details of the present invention may be changed in various manners without departing from the scope of the present invention.

The present application claims a priority based on Japanese Patent Application JP 2009-066428 filed on Mar. 18, 2009, the entire contents of which being incorporated herein by reference in its entirety.

The invention claimed is:

1. An optical transmission device that is connected to transmission paths of a network, that performs optical communication according to a wavelength division multiplex format and that transmits optical signals over the transmission paths according to each path type that has been set to each of wavelengths of the optical signals, said path type being any one of an add, a drop, or a through for an optical signal to a transmission path to which the optical transmission device is connected, comprising:
   an upper limit value storage section that stores an upper limit value of the number of operational wavelengths that is the number of wavelengths to which said path types are set;
   an acceptance section that accepts a changing request that requests that said number of operational wavelengths be changed; and
   a license determination section which newly sets the changed number of wavelengths for the number of operational wavelengths if the number of wavelengths that has been changed according to said accepted changing request is equal to or smaller than said stored upper limit value.

2. The optical transmission device as set forth in claim 1, wherein said changing request contains the number of wavelengths to each of said path type is newly set, and wherein if the total number of operational wavelengths, of which the number of wavelengths contained in said accepted changing request is added to the number of operational wavelengths, is equal to or smaller than said stored upper limit value, said license determination section newly sets the total number of operational wavelengths for the number of operational wavelengths.

3. The optical transmission device as set forth in claim 2, comprising:
   an optical wavelength path selecting section that manages each path type of each of wavelengths to which said path type has been set; and
   an optical power level supervisory section that manages power levels of optical signals having each of wavelengths to which said path type has been set,
   wherein if said total number of operational wavelengths is equal to or smaller than said stored upper limit value, said license determination section outputs information containing the total number of operational wavelengths to said optical wavelength path selecting section and said optical power level supervisory section.

4. The optical transmission device as set forth in claim 2, wherein if said total number of operational wavelengths is equal to or smaller than said stored upper limit value, said license determination section sets optical wavelength transmission and reception modules that transmit and receive respective wavelengths of optical signals over transmission paths to which the optical transmission device is connected, the number of the optical wavelength transmission and reception modules that are set being equal to the total number of operational wavelengths.

5. The optical transmission device as set forth in claim 1, wherein said acceptance section accepts an upper limit value changing request that requests that said stored upper limit value be changed, and
   wherein if the number of wavelengths of which the upper limit value has been changed according to said accepted upper limit value changing request is equal to or smaller than the number of wavelengths predetermined based on hardware performance of the optical transmission device, the optical transmission device has an upper limit value setting section that stores the changed number of wavelengths as a new upper limit value in said upper limit value storage section.

6. An operational wavelength number restricting method for an optical transmission device having an optical wavelength path selecting section that is connected to transmission paths of a network, that performs optical communication according to a wavelength division multiplex format, that transmits optical signals over the transmission paths according to each path type that has been set to each of wavelengths of the optical signals, said path type being any one of an add, a drop, or a through for an optical signal to a transmission path to which the optical transmission device is connected, and that manages each path type of each of wavelengths to which said path type has been set and an optical power level supervisory section that manages power levels of optical signals having each of wavelengths to which said path type has been set, comprising:
   a process that accepts a changing request that requests that said number of operational wavelengths be changed; and
   a determination process that newly sets the changed number of wavelengths for the number of operational wavelengths if the number of wavelengths that has been changed according to said accepted changing request is equal to or smaller than a predetermined upper limit value.

7. The operational wavelength number restricting method as set forth in claim 6, wherein said changing request contains the number of wavelengths to each of which said path type is newly set, and wherein if the total number of operational wavelengths of which the number of wavelengths contained in said accepted changing request is added to the number of operational wavelengths is equal to or smaller than said upper limit value, said determination process is a process that newly sets the total number of operational wavelengths for the number of operational wavelengths.

8. The operational wavelength number restricting method as set forth in claim 7, further comprising:

a process that outputs information containing the total number of operational wavelengths to said optical wavelength path selecting section and said optical power level supervisory section if said total number of operational wavelengths is equal to or smaller than said upper limit value.

9. The operational wavelength number restricting method as set forth in claim 7, further comprising:

a process that sets optical wavelength transmission and reception modules that transmit and receive respective wavelengths of optical signals over transmission paths to which the optical transmission device is connected, the number of the optical wavelength transmission and reception modules that are set being equal to the total number of operational wavelengths if said total number of operational wavelengths is equal to or smaller than said upper limit value.

10. The operational wavelength number restricting method as set forth in claim 6, further comprising:

a process that accepts an upper limit value changing request that requests that said upper limit value be changed, and a process that sets the changed number of wavelengths for a new upper limit value if the number of wavelengths of which the upper limit value has been changed according to said accepted upper limit value changing request is equal to or smaller than the number of wavelengths predetermined based on hardware performance of the optical transmission device.

11. A non-transitory computer readable recording medium in which an program is recorded, wherein said program causes an optical transmission device having an optical wavelength path selecting section that is connected to transmission paths of a network, that performs optical communication according to a wavelength division multiplex format, that transmits optical signals over the transmission paths according to each path type that has been set to each of wavelengths of the optical signals, said path type being any one of an add, a drop, or a through for an optical signal to a transmission path to which the optical transmission device is connected, and that manages each path type of each of wavelengths to which said path type has been set and an optical power level supervisory section that manages power levels of optical signals having wavelengths to which said path type has been set to accomplish the functions, comprising:

a function that accepts a changing request that requests that said number of operational wavelengths be changed; and a determination function that newly sets the changed number of wavelengths for the number of operational wavelengths if the number of wavelengths that has been changed according to said accepted changing request is equal to or smaller than a predetermined upper limit value.

12. The non-transitory computer readable recording medium as set forth in claim 11, wherein said changing request contains the number of wavelengths to each of which said path type is are newly set, and wherein if the total number of operational wavelengths, of which the number of wavelengths contained in said accepted changing request is added to the number of operational wavelengths, is equal to or smaller than said upper limit value, said determination function is a function that newly sets the total number of operational wavelengths for the number of operational wavelengths.

13. The non-transitory computer readable recording medium as set forth in claim 12, wherein said program causes said optical transmission device to accomplish the functions, further comprising:

a function that outputs information containing the total number of operational wavelengths to said optical wavelength path selecting section and said optical power level supervisory section if said total number of operational wavelengths is equal to or smaller than said upper limit value.

14. The non-transitory computer readable recording medium as set forth in claim 12, wherein said program causes said optical transmission device to accomplish the functions, further comprising:

a function that sets optical wavelength transmission and reception modules that transmit and receive respective wavelengths of optical signals over transmission paths to which the optical transmission device is connected, the number of the optical wavelength transmission and reception modules that are set being equal to the total number of operational wavelengths if said total number of operational wavelengths is equal to or smaller than said upper limit value.

15. The non-transitory computer readable recording medium as set forth in claim 11, wherein said program causes said optical transmission device to accomplish the functions, further comprising:

a function that accepts an upper limit value changing request that requests that said upper limit value be changed, and a function that sets the changed number of wavelengths for a new upper limit value if the number of wavelengths, of which the upper limit value has been changed according to said accepted upper limit value changing request, is equal to or smaller than the number of wavelengths predetermined based on hardware performance of the optical transmission device.

* * * * *